(12) United States Patent
Romero

(10) Patent No.: US 6,730,431 B2
(45) Date of Patent: May 4, 2004

(54) BATTERY HAVING TUBE COLLAPSING VENT SYSTEM AND OVERCHARGE PROTECTION

(75) Inventor: Antonio L. Romero, Parkton, MD (US)

(73) Assignee: Alcatel, Paris (FR)

( * ) Notice: Subject to any disclaimer, the term of this patent is extended or adjusted under 35 U.S.C. 154(b) by 209 days.

(21) Appl. No.: 10/020,953

(22) Filed: Dec. 19, 2001

(65) Prior Publication Data
US 2003/0113614 A1 Jun. 19, 2003

(51) Int. Cl.$^7$ .............................. H01M 2/02; H01M 2/12
(52) U.S. Cl. .................. 429/61; 429/82; 429/94; 429/164
(58) Field of Search ..................... 429/61, 56, 82, 429/94, 164

(56) References Cited

U.S. PATENT DOCUMENTS

| | | | |
|---|---|---|---|
| 3,048,645 A | 8/1962 | Ruben | |
| 4,601,959 A | 7/1986 | Romero | |
| 4,698,282 A | 10/1987 | Mantello | |
| 4,992,339 A | 2/1991 | Georgopoulos | |
| 5,389,457 A | 2/1995 | Urry | |
| 5,418,082 A | 5/1995 | Taki et al. | |
| 5,510,204 A | 4/1996 | Urry | |
| 5,609,972 A | 3/1997 | Kaschmitter et al. | |
| 5,677,076 A | 10/1997 | Sato et al. | |
| 5,741,606 A | 4/1998 | Mayer et al. | |
| 5,747,187 A | 5/1998 | Byon | |
| 5,998,051 A | 12/1999 | Poirier et al. | |
| 6,045,939 A | 4/2000 | Tateno et al. | |
| 6,060,185 A | 5/2000 | Okutoh | |
| 6,063,518 A | 5/2000 | Dewulf et al. | |
| 6,120,928 A | 9/2000 | Azema | |
| 6,159,631 A | 12/2000 | Thompson et al. | |
| 2002/0064705 A1 * | 5/2002 | Cramer et al. | 429/82 |

* cited by examiner

Primary Examiner—John S. Maples
(74) Attorney, Agent, or Firm—Sughrue Mion, PLLC

(57) ABSTRACT

A novel battery with a venting device and overcharge protection system. The battery casing has an inner tube that completely surrounds a hollow core, an outer tube that surrounds the inner tube, and end plates. The inner tube is welded at its ends to two end plates. The inner tube, outer tube, and end plates form a sealed, hermetic annular space in which the battery components are held. The inner tube is designed to collapse into the hollow core when a pressure inside the annular space exceeds a predetermined collapsing pressure, and the welds connecting the inner tube to the end plates are designed to break when the pressure inside the annular space exceeds a predetermined breaking pressure. In addition, the invention can take advantage of the fact that the inner tube is negatively charged by have a connecting member, which is electrically connected to the anode and thus positively charged, that extends into the hollow core. When the negatively charged inner tube collapses, it makes contact with the positively charged connecting member, to provide a short circuit for reducing the voltage of the battery.

27 Claims, 5 Drawing Sheets

BATTERY HAVING TUBE COLLAPSING VENT SYSTEM AND OVERCHARGE PROTECTION

FIELD OF THE INVENTION

The present invention generally relates to the field of batteries, in particular the present invention is directed to a novel battery having a collapsing vent system and overcharge protection.

BACKGROUND OF THE INVENTION

A persistent problem associated with the design of many types of sealed batteries is that under certain conditions the internal pressure generated by the electrochemical system contained within the sealed battery causes the battery to explode. This problem occurs in Lithium-ion cells as well as other battery types. The excessive internal pressure may be created by a chemical reaction or by the expansion of gases within the battery due to the presence of excessive heat. Alternatively, the battery may explode if there is a short circuit, if the battery is recharge too rapidly, or if the battery is recharged over an extended period of time. Therefore, it is important to have a safety mechanism for venting pressurized gases from the battery before a dangerous situation is encountered.

In some existing battery venting mechanisms, the vent is a separate part welded to one end of the cell. This type of system has flow limitations because it allows the battery to vent at only one end of the cell. Thus, when this type of battery has a fast thermal reaction, the vent opening can become clogged causing the cell enclosure to rupture and the cell components to burn.

A related problem is that existing batteries do not have an overcharge protection that is part of the battery's structure. Generally, the only overcharge protection is provided by an active device associated with the battery pack electronics. This lack of protection is a serious concern because a dangerous condition exists if a battery remains at an overcharged state or continues to charge during venting of excessive heat or pressurized gases. Furthermore, if a safety feature could prevent the pressure within the battery from reaching a level where venting is required, a dangerous situation would be avoided without the release of gases.

SUMMARY OF THE INVENTION

The present invention is directed to eliminating the above problems associated with existing batteries, and more specifically battery venting mechanisms, through the use of a novel venting device and overcharge protection system. The present invention avoids the above problems associated with existing vent mechanisms by employing a number of novel features, which will be discussed here briefly, and in more detail below.

The battery casing has an inner tube that completely surrounds a hollow core and an outer tube that surrounds the inner tube. The inner tube is connected at both ends to two end plates. The inner tube, outer tube, and end plates form a sealed, hermetic annular space in which the battery components are held. The inner tube is designed to collapse into the hollow core when a pressure inside the annular space exceeds a predetermined collapsing pressure, and the welds connecting the inner tube to the end plates are designed to break when the pressure inside the annular space exceeds a predetermined breaking pressure.

In addition, the invention can take advantage of the fact that the inner tube is negatively charged by have a connecting member, which is electrically connected to the anode and thus positively charged, that extends into the hollow core. When the negatively charged inner tube collapses, it makes contact with the positively charged connecting member, to provide a short circuit for reducing the voltage of the battery.

BRIEF DESCRIPTION OF THE DRAWINGS

The advantages, nature and various additional features of the invention will appear more fully upon consideration of the illustrative embodiment of the invention which is schematically set forth in the drawings, in which.

DETAILED DESCRIPTION OF THE INVENTION

The present invention will be explained in further detail by making reference to the accompanying drawings, which do not limit the scope of the invention in any way. Experiments have been performed with Lithium-ion cells, but the principles of this invention apply to other batteries that experience increased internal pressure.

Venting Device

Figure 1:
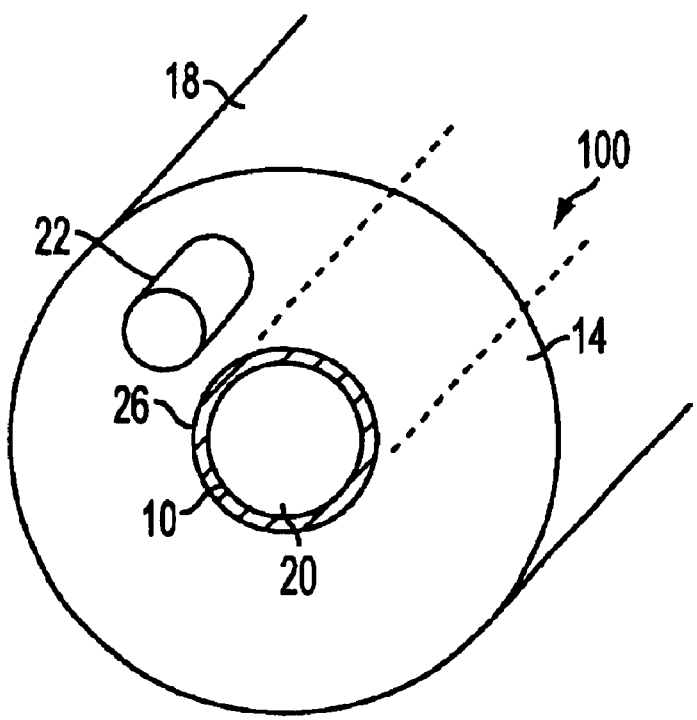
FIG. 1 is a three dimensional view of the battery before the inner tube collapses.
Figure 2:
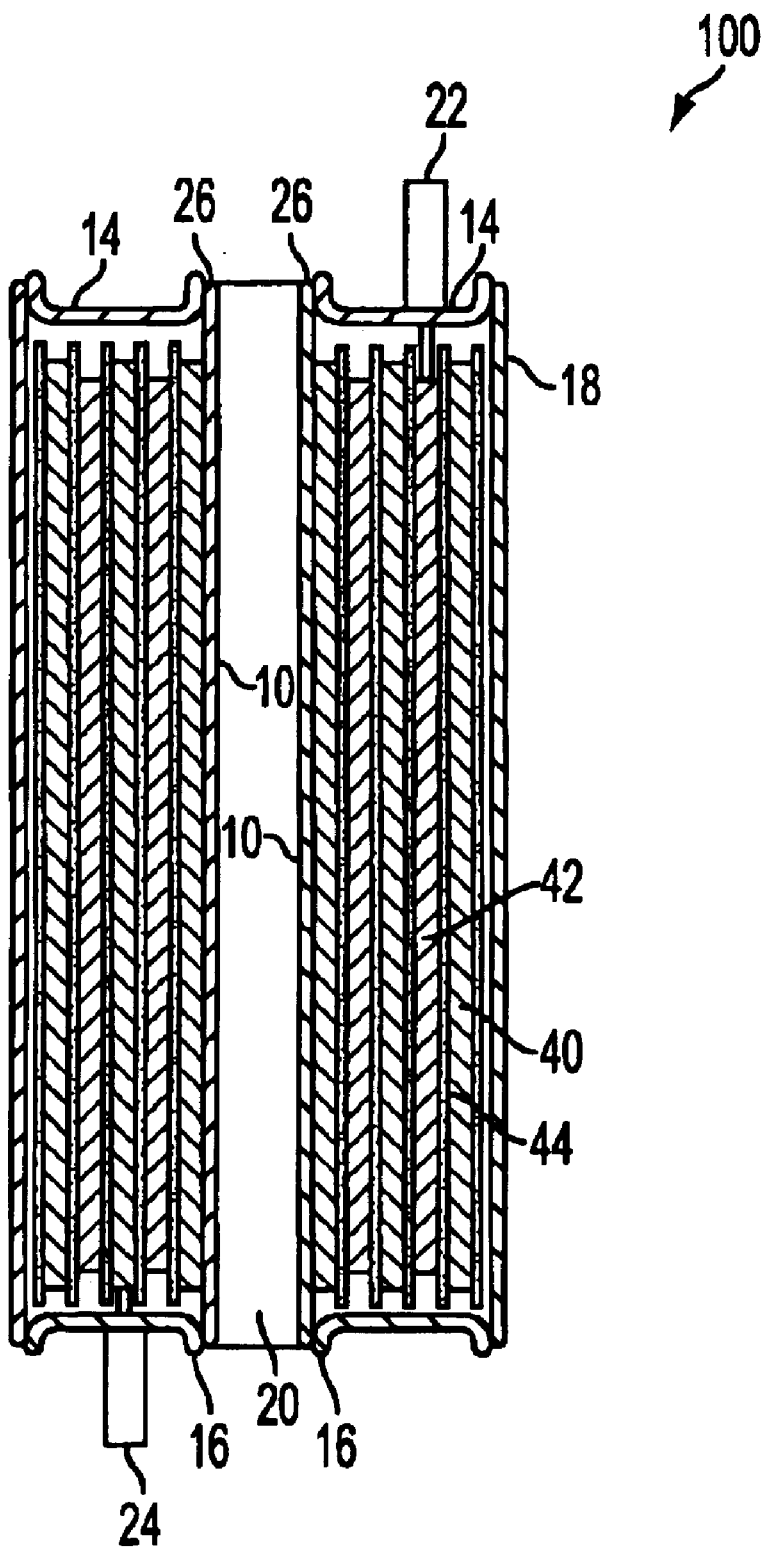
FIG. 2 is a cross-sectional view of the battery before the inner tube collapses.

Referring to the FIGS. 1 and 2, a battery casing 100 houses an electrode assembly with an anode 40, a cathode 42, and an electrolytic separator 44. The casing includes an inner tube 10, and outer tube 12, and two end plates 14, 16 to create a sealed annular space.

In this embodiment, the inner tube 10 is about 0.007 inches thick with an outside diameter of 0.625 inches, the outer tube 18 is about 0.011 inches thick, and the end members are about 0.015 inches thick. The outer tube 18 and end plates 14, 16 and are made of 1008/1010 CRS steel, but they may be made of another suitable metal, and the inner tube is made of 304 SS steel.

The inner tube 10 is a ribless surface, which is not reinforced with grooves. The end plates 14, 16 are attached to the ends of the inner tube 10 and outer tube 18. In this embodiment, the end plates 14, 16 are attached to the inner tube 10 by welds 26 and to the outer tube 18 by additional welds, but the invention is not limited in this respect.

The anode 40 and cathode 42 are separated by the separator 44 and are spirally wound around the inner tube 10. The inner wall 10 surrounds a hollow core 20. A positive terminal 22 is connected to the cathode 42 and extends through one of the end plates 14, and negative terminal 24 is connected to the other end plate 16. The inner wall 10 is electrically connected to the anode, and is there fore negatively charged.

In this embodiment, the end plates 14, 16 are semi-rigid structures formed by an inner cylinder, an outer cylinder, and a plate that extends between one of the ends of the outer cylinder and one of the ends of the inner cylinder, as shown in FIG. 2.

Figure 3:
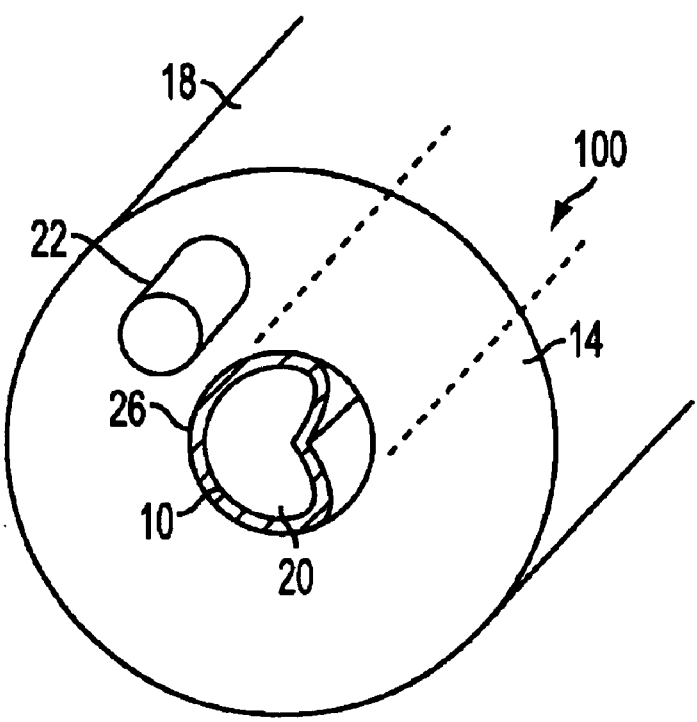
FIG. 3 is a three dimensional view of one end of the battery after the inner tube collapses.

When the pressure created by the charging of the battery increases to a first predetermined level within the annular space, a force within the annular space causes the inner tube 10 to collapse and flatten into the hollow core 20. FIG. 3 shows the battery after the inner tube has collapsed. The inner wall 10 is specifically designed so that it will collapse when it experiences a force caused by a pressure at a predetermined level. The ribless surface of the inner wall allows the tube to uniformly collapse rather than break at a predetermined pressure, as occurs in existing venting systems. In this embodiment, the force is about 140 psi. The collapsing of the inner tube 10 increases the volume within the annular space. This increase in volume also increases the spacing between the anode electrode and cathode electrode, which reduces the current between the electrodes, and thus the power of the battery.

If the pressure within the annular space continues to increase even after the collapsing the inner tube 10, the connection between the end plates 14, 16 and the inner tube will break at a predetermined higher pressure. In another embodiment, the pressure at which the connection between the end plates 14,16 and the inner tube 10 breaks can be the same pressure as the pressure where the inner tube 10 collapses. In this embodiment, the welds 26 connecting the inner tube 10 and end plates 14, 16 are designed to break at a pressure of about 250 to 300 psi. The breaking of the welds 26 at this pressure allows the battery to vent before reaching an unsafe pressure, such as 400 psi.

Figure 4:
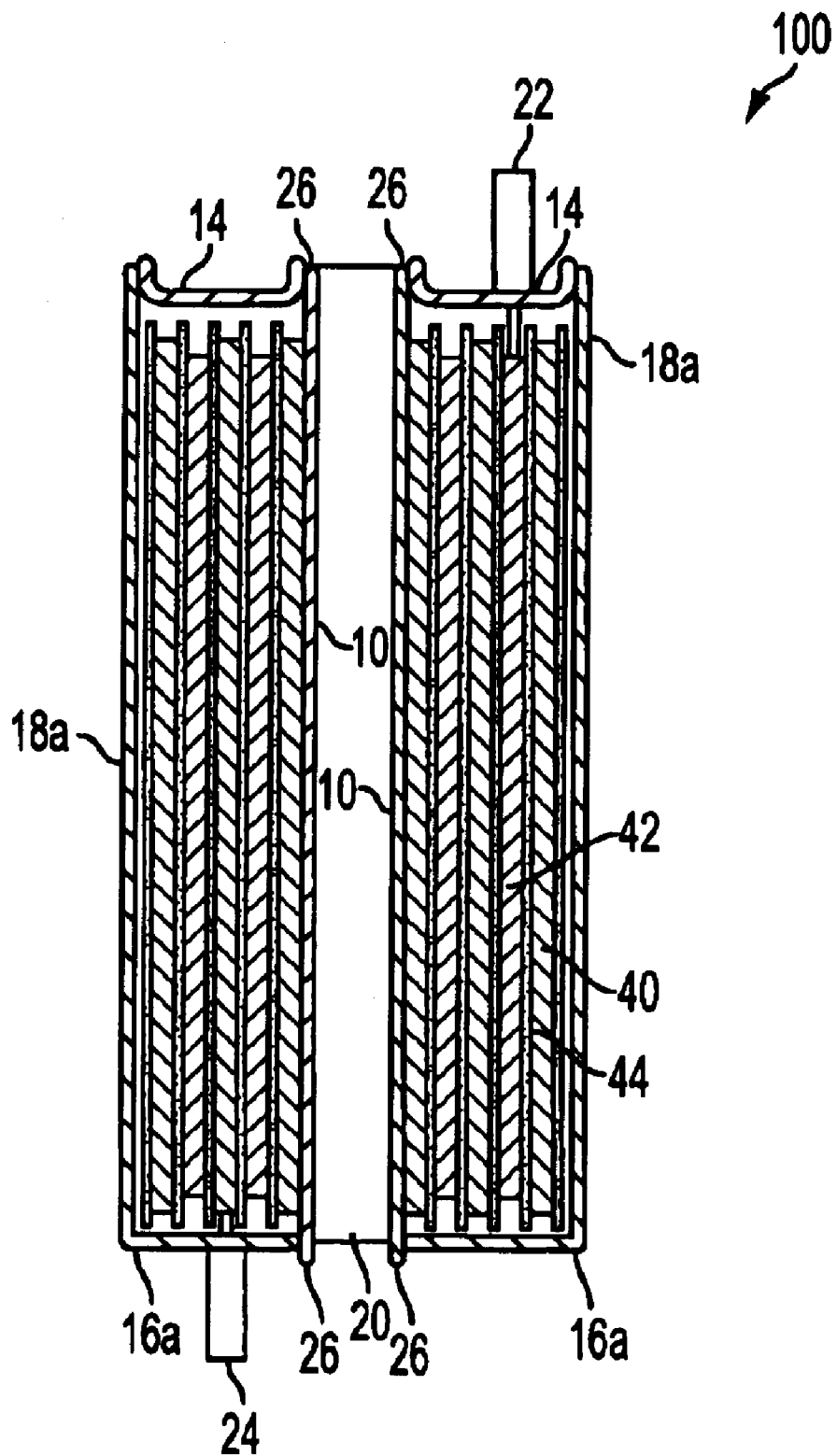
FIG. 4 is a cross-sectional view of the battery before the inner tube collapses in which one of the end plates and the outer tube form a single part.

Referring to FIG. 4, in an alternative embodiment, the end plate 16a near the negative terminal 24 and the outer tube 18 form a single part. As in the previously described embodiments, the inner tube 10 is welded to the end plate 16a portion of the single part.

Overcharge Protection System

Figure 5:
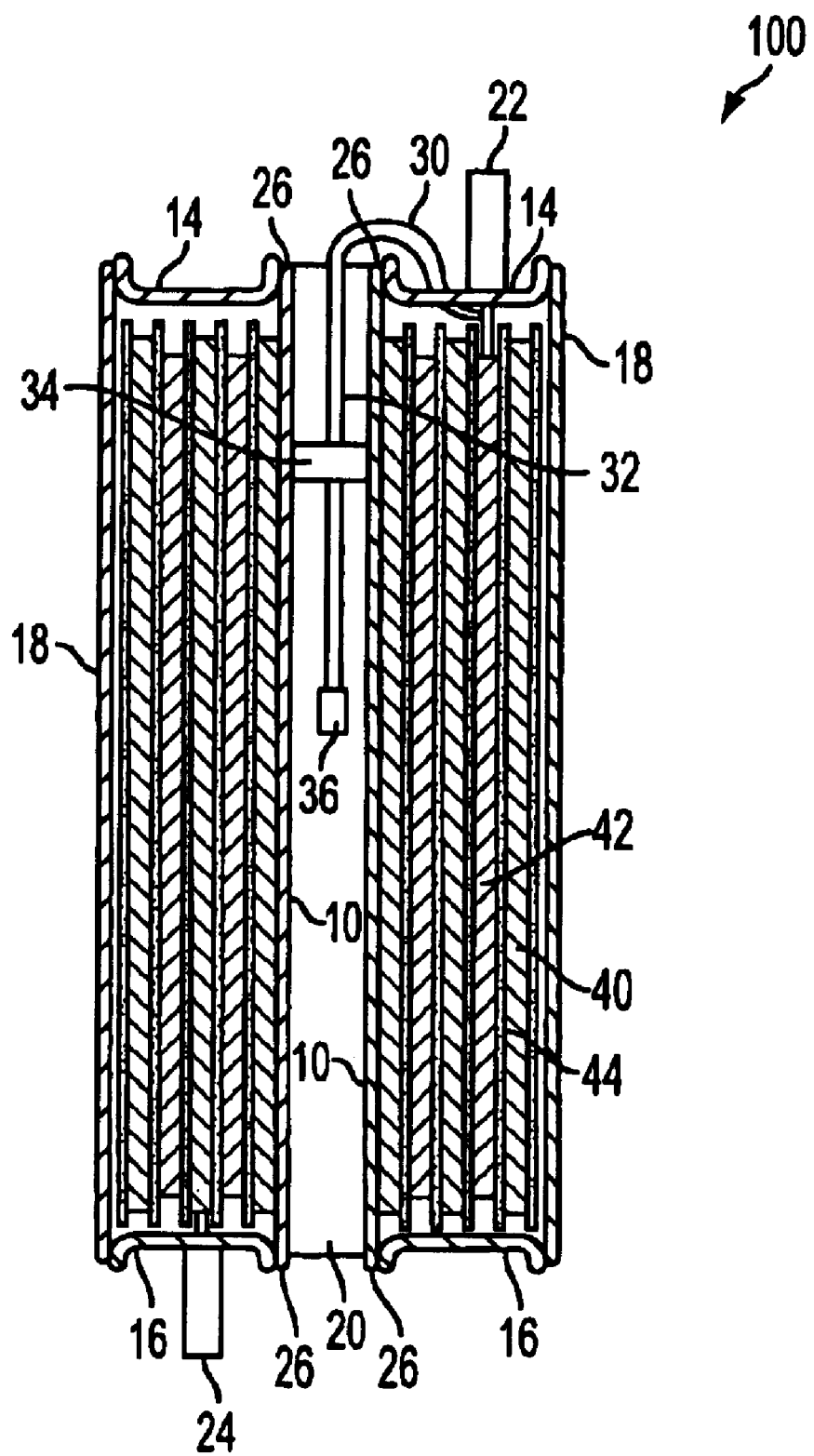
FIG. 5 is a cross-sectional view of the battery with the overcharge protection device before the inner tube collapses.
Figure 6:
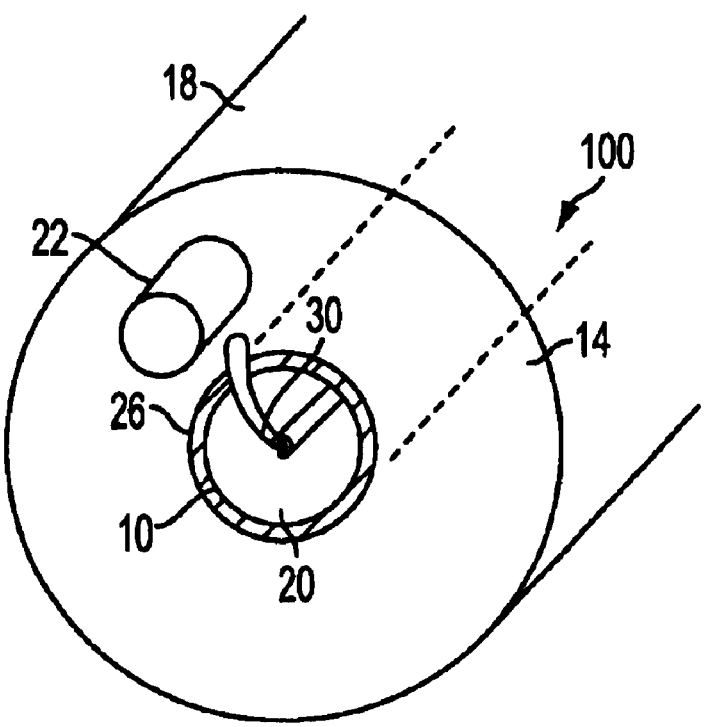
FIG. 6 is a three dimensional view of the battery with overcharge protection device before the inner tube collapses.

As shown in FIGS. 5 and 6, the invention can also have an overcharge protection system. This system includes a conductive member 30 that is connected to the positive terminal 22. In this embodiment, the conductive member 30 is welded to the positive terminal 22, but other means of conductivity coupling the member 30 to the terminal 22 so that wire 30 is to the positive terminal 16 may also be used. It extend through the end plate 14, and then into the hollow core 20.

In this embodiment, the conductive member is a 0.03 to 0.04 inch diameter tungsten wire, but other conductive materials such as 18 Gauge Nickel Chromium wire can be used. An insulating material 32 is formed around the portion of the wire that extends from the positive terminal 22 to the end portion 34 located within the hollow core 20. The insulating material 32 is shrink tubing in this embodiment, but any suitable insulating material may be used.

The end portion 36 is a larger diameter than the conductive member 30. In this embodiment, the end portion is a 0.125 inch diameter copper cylinder that is press fit on the wire 30. A nonconductive support 34 is attached to the wire 30 and located within the hollow core 20.

Figure 7:
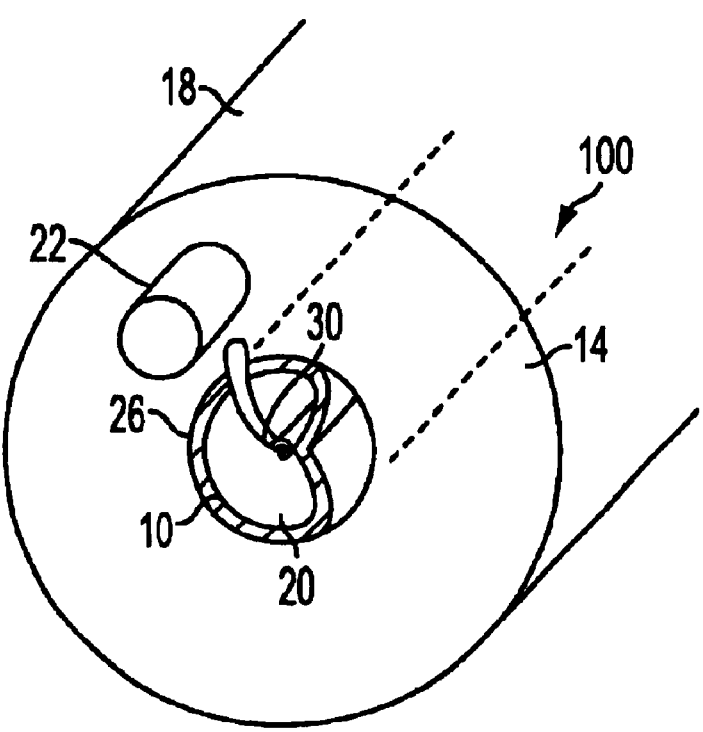
FIG. 7 is a three dimensional view of the battery with overcharge protection device after the inner tube collapses.

Just like the embodiment described above, when the battery cell reaches an excessive voltage or the cell is exposed to excessive heat, the internal pressure within the annular portion of the battery casing 100 causes the inner tube 10 to collapse and flatten into the hollow core 20. FIG. 7 shows the battery after the inner tube has collapsed. This embodiment is designed so that the inner tube collapses at 4.75 Volts. When the inner tube 10 collapses, it makes contact with the wire 30, creating a short circuit between the positive terminal and the negatively charged inner wall 10. This short circuit reduces the excessive voltage, thus preventing electrolyte decomposition within the battery, which would result in an exothermic reaction and significantly increased pressures.

If the pressure within the annular space continues to increase, the welds 26 between the inner tube 10 and the end plates 14, 16 will break in the same manner as described earlier with respect to the venting device.

The insulating material 32 prevents the conductive member 30 from touching the battery casing 100, which would prematurely create a short circuit. The support portion 34 prevents the conductive member 30 from contacting the inner tube 10 during shock or vibration. The larger diameter end portion 36 provides a larger surface for the inner tube 10 to contact when it collapses. The conductive member 30 is designed so that its resistance value will support a current higher than the normal battery charge current, but is limited to avoid the overheating of the wire 30 and battery 100.

Tests were conducted with a Lithium-ion cell. In these experiments, the inner wall 10 collapsed due to excessive pressure when the cell was overcharged to 4.5 Volts and when the cell was exposed to a temperature of 150° C. for an extended period of time. It is of course understood that departures can be made from the preferred embodiment of the invention by those of ordinary skill in the art without departing from the spirit and scope of the invention that is limited only by the following claims, such as applying this invention to other types of batteries, using different conductive materials, or changing the sizes of the components.

What is claimed is:

1. A battery, comprising:
   a casing including
   an inner tube with two ends, wherein the inner tube is designed to completely surround a hollow core;
   an outer tube with a first and second ends; wherein the outer tube surrounds the inner tube, and
   first and second end plates, the first end plate connected to the first end of the inner tube, and a second end plate connected to the second end of the inner tube, wherein the outer tube, inner tube, and end plates surround a sealed annular space;
   one cathode electrode,
   one anode electrode, and
   an separator between the electrodes;
   wherein the cathode, anode, and separator are housed in the casing, and the inner tube is designed to collapse into the hollow core when a pressure inside the annular space exceeds a predetermined collapsing pressure.

2. The battery of claim 1, wherein a connection between the inner tube and at least one of the end plates is designed to break when the pressure inside the annular space exceeds a predetermined breaking pressure.

3. The battery of claim 2, wherein the connection between the inner tube and at least one of the end plates is a weld.

4. The battery of claim 2, wherein the breaking of the connection allows a venting of the pressure within the battery.

5. The battery of claim 4, wherein the venting takes place at the connection between the inner tube and both the first and second end plates.

6. The battery of claim 4, wherein the pressure inside the annular space is caused by expansion of gases within the battery, and the venting releases the gases.

7. The battery of claim 2, wherein at least one of the end plates comprises an inner cylinder with two ends; an outer cylinder with two ends, wherein the outer cylinder is formed around the inner cylinder and is of the same length as the inner cylinder; and a plate that extends between one of the ends of the outer cylinder and one of the ends of the inner cylinder.

8. The battery of claim 2, wherein the predetermined breaking pressure is greater than the predetermined collapsing pressure.

9. The battery of claim 1, wherein the cathode electrode, the anode electrode, and the separator form a spiral within the annular space, and the separator provides a fixed spacing between the electrodes.

10. The battery of claim 9, wherein the collapsing of the tube increases the spacing between the electrodes.

11. The battery of claim 10, wherein the increase in spacing between the electrodes reduces a current between the electrodes.

12. The battery of claim 2, wherein the inner tube is ribless.

13. The battery of claim 2, wherein connections between both ends of the ends of the inner tube and the end plates are designed to break at the predetermined breaking pressure.

14. The battery of claim 2, wherein the battery is a lithium ion cell.

15. A battery, comprising:
  a casing including
    an inner tube with two ends, wherein the inner tube is designed to completely surround a hollow core;
    an outer tube with a first and second ends; wherein the outer tube surrounds the inner tube, and
    first and second end plates, the first end plate connected to the first end of the inner tube, and a second end plate connected to the second end of the inner tube, wherein the outer tube, inner tube, and end plates surround a sealed annular space;
  one cathode electrode;
  one anode electrode;
  an separator between the electrodes;
  a positive terminal connected to the anode,
  and a conductive member connected to the positive terminal that extends through the first end plate and into the hollow core;

wherein the cathode, anode and separator are housed in the casing and the positive terminal extends out from the annular space through the first end plate, and the cathode is connected to the casing, wherein the inner tube is designed to collapse into the hollow core when a pressure inside the annular space exceeds a predetermined collapsing pressure, and the inner tube makes contact with the conductive member when the inner tube collapses.

16. The battery of claim 15, wherein the conductive member is made of conductive material and the inner tube is made of conductive material.

17. The battery of claim 16, wherein conductive member is a wire.

18. The battery of claim 17, wherein the wire has an end portion of increased diameter located within the hollow core, and the inner tube makes contact with the end portion when the inner tube collapses into the hollow core.

19. The battery of claim 15, wherein part of the conductive member is insulated.

20. The battery of claim 15, further comprising a support, wherein the support positions the resistance wire within the hollow core.

21. The battery of claim 15, wherein the contact between the inner tube and conductive member creates a short circuit between the anode and cathode.

22. The battery of claim 21, wherein the short circuit reduces a voltage within the annular space.

23. The battery of claim 15, wherein a connection between the inner tube and at least one of the end plates is designed to break when the pressure inside the annular space exceeds a predetermined breaking pressure.

24. The battery of claim 22, wherein the predetermined breaking pressure is greater than the predetermined collapsing pressure.

25. The battery of claim 23, the connection between the inner tube and one of the end plates is a weld.

26. The battery of claim 23, wherein connections between both ends of the inner tube and the end plates are designed to collapse at the predetermined breaking pressure.

27. The battery of claim 15, wherein the battery is a lithium ion cell.

* * * * *